United States Patent Office 3,198,604
Patented Aug. 3, 1965

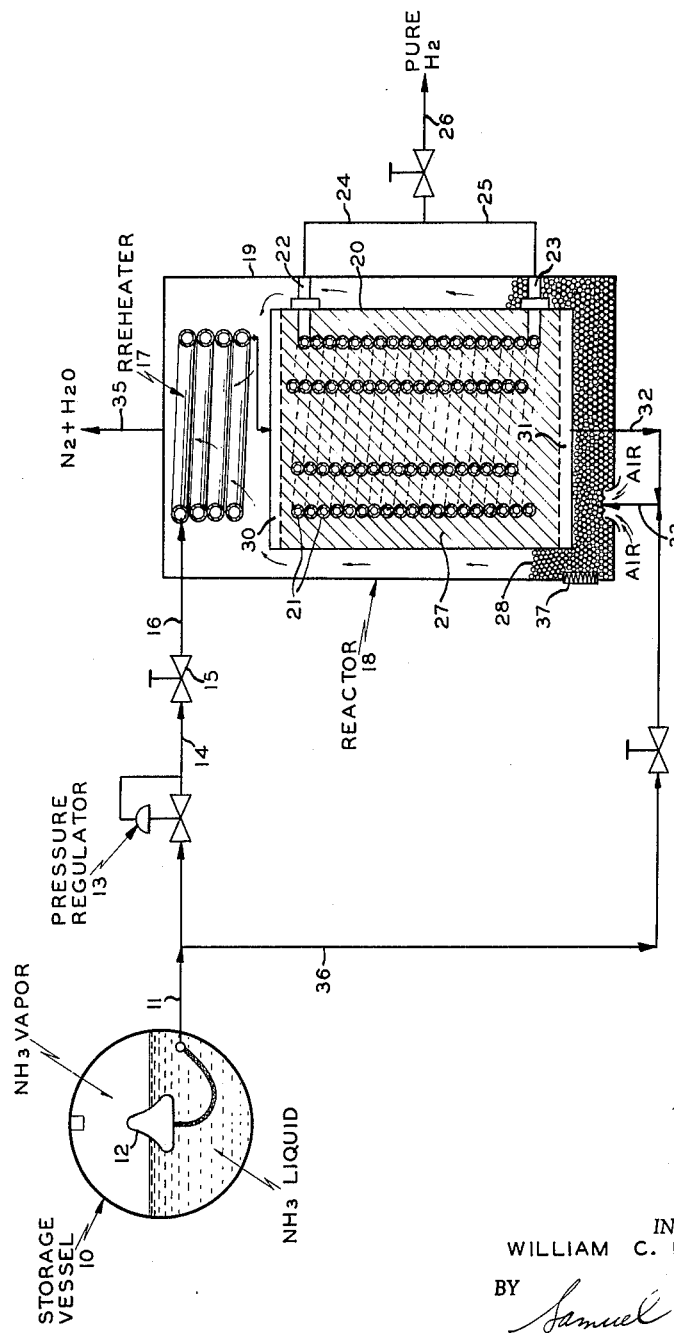

3,198,604
HYDROGEN GENERATING SYSTEM
William C. Pfefferle, Middletown, N.J., assignor to Engelhard Industries, Inc., Newark, N.J., a corporation of Delaware
Filed May 28, 1962, Ser. No. 198,275
19 Claims. (Cl. 23—212)

This invention relates to methods for the production of hydrogen. More particularly, the invention concerns novel methods for the generation of hydrogen in compact generating apparatus which can be readily designed as a self-contained hydrogen generator. The invention is particularly concerned with methods and apparatus for generation of hydrogen of sufficient purity to serve as a fuel supply for hydrogen-oxygen fuel cells for the production of electricity, and finds particular application in the design and fabrication of shipboard or submarine units for such usage.

Numerous chemical conversions are known to the prior art for the production of gas streams containing hydrogen and which can serve, provided the hydrogen-containing stream is freed of associated impurities, as sources of hydrogen for fuel cell utilization. Among such conversions are well known industrial processes for the reaction of solid carbonaceous or gaseous or liquid hydrocarbon feed stocks with steam and/or oxygen to produce mixtures of carbon monoxide and hydrogen. Such processes provide a hydrogen-containing gas mixture which requires considerable purification prior to use as a fuel cell feed, particularly for removal of traces of carbon monoxide which is a potent poison for catalysts normally employed in fuel cell electrodes. In the utilization of such processes for the economic production of hydrogen, careful attention must be given to the overall heat balance and heat requirements of the hydrogen-generating reaction, since economy of heat utilization is essential to reasonable hydrogen cost. This factor is particularly important when it is desired to produce a compact, integral unit for hydrogen generation suitable for shipboard or submarine usage. In such applications, economy of operation and compactness of design require that complex heat exchangers and condenser systems be eliminated because of limited space availability.

An alternative source of hydrogen, and one which is of particular interest in the practice of the present invention, is the catalytic dissociation of ammonia to provide a gaseous mixture of nitrogen and hydrogen. The utilization of ammonia as a source of hydrogen is economically attractive, and provides the added advantage that $NH_3$ or $N_2$ impurities which, in the event of leakage might contaminate the hydrogen feed to a fuel cell, are harmless and ordinarily do not adversely affect the electrodes thereof.

Briefly, the present invention provides method and apparatus for the generation of pure hydrogen wherein separation of hydrogen is effected by diffusion means from a reaction mixture produced by catalytically splitting ammonia in a reaction zone to produce nitrogen and hydrogen, and heat is supplied to the reaction zone by combustion of the undiffused gaseous products of the cracking reaction containing unconverted ammonia and undiffused hydrogen. By only partially withdrawing the hydrogen from the cracked ammonia reaction products, a relatively high diffusion rate is obtained. The amount of $H_2$ withdrawn may range broadly from about 20 to about 75% of that produced, or even higher, e.g. up to 90% of the hydrogen formed. For example, in a stand-by operation, little or no $H_2$ need be withdrawn. In relatively large size units (e.g. delivering about 500 cu. ft./hr. of hydrogen, or larger) about 90% of the $H_2$ can be withdrawn, depending on the cracking efficiency. In small units, heat losses require that a substantial amount of $H_2$ be left in the residual gas, usually about 30–50%. A large amount of residual $H_2$ means that relatively small diffusion elements can be used because the $H_2$ partial pressure is relatively high.

In a preferred embodiment of the present invention, hydrogen diffusion through hydrogen-permeable membranes is employed for removal of hydrogen during the course of ammonia cracking reaction to separate, either continuously or intermittently, a pure hydrogen stream from an undiffused reaction mixture, and to thus promote the formation of additional reaction product by further conversion of $NH_3$ in the gaseous reaction mixture. By reducing the hydrogen concentration in the gas mixture undergoing reaction, the overall equilibrium for the dissociation of ammonia is shifted toward formation of additional reaction product, i.e. hydrogen and nitrogen. As a result, a more complete conversion of ammonia feed is obtained than could be realized in the absence of hydrogen removal during the course of the cracking reaction under similar reaction conditions. The principles and advantages of diffusion separation of hydrogen during reaction such as ammonia splitting is more fully described in my copending application Serial No. 196,552, filed May 15, 1962.

An important feature of the present invention is the utilization of the undiffused gases separated from the cracking or unitary cracking-diffusion zone as a source of heat for satisfying the heat requirements of the endothermic ammonia cracking reaction. Such undiffused off-gases are burned with oxygen or air, preferably by passing the gases in admixture with oxygen-containing gas over a combustion catalyst disposed adjacent to or surrounding the ammonia cracking catalyst so as to maximize the overall heat conservation and to reduce the heat loss to a minimum. Where sufficient $H_2$ is present in such undiffused off-gases to be within the flammability limit of $H_2$ in air, i.e. about 15% or more $H_2$, it is not necessary to use a combustion catalyst. On being ignited, the $H_2$ will continue to burn. By so operating, high overall efficiency of the process, both in terms of heat balance and conversion of ammonia, is readily realized.

The equation for the $NH_3$ dissociation reaction is $$NH_3 \rightarrow 3/2 H_2 + 1/2 N_2$$

Conventionally, a process involving such reaction operates at 1200° to 1800° F. (about 650° to 990° C.) at pressures from atmospheric to about 10 p.s.i.g. Equilibrium constants, based on partial pressures, for such reaction at various temperatures are:

$K_p$ at 800° F. $= 1.10 \times 10^2$
$K_p$ at 850° F. $= 1.55 \times 10^2$
$K_p$ at 1200° F. $= 1.01 \times 10^3$
$K_p$ at 1800° F. $= 6.80 \times 10^3$ showing that dissociation is not favored by lower temperature.

Using conventional systems, at 850° F. and 1 atmosphere, a maximum of 99.6% conversion of $NH_3$ can be achieved. However, such conditions impose the limitations of low pressure systems whereas it would be more economical to operate at higher pressures. If the reaction is operated at 850° F. and 40 atmospheres, conventional systems could achieve a maximum of only 87% conversion because of equilibrium limitations, and in practice, only about 60–80% conversion could be realized. Such a process is economically disadvantageous. At about 1800° F., a pressure of 40 atmospheres can be employed in order to effect a maximum conversion of 99.6%.

However, using the process of this invention at 850° F. and 40 atmospheres, and maintaining the $H_2$ partial pressure at 1 atmosphere, about 99.9% conversion of $NH_3$ is achieved.

Thus it is evident that even at reasonably low temperature, the process of this invention is advantageous. This advantage increases as the pressure increases since the process is pressure independent while in conventional methods conversion decreases with increase in pressure. The process of the present invention is advantageously operated at temperatures between about 800° F. and about 1400° F., preferably about 800° F. to about 1200° F.

Catalysts for $NH_3$ dissociation which are active at temperatures lower than 1200° to 1800° F. are known. For example, U.S. Patent No. 2,601,221 discloses precious metal catalysts which can be used for $NH_3$ dissociation at about 850°–950° F. The diffusion element alone can serve as the catalyst, and will be effective as the cracking catalyst at temperatures as least as low as 900° F.

The benefits derived from the use of lower temperatures and higher pressures for operation of an $NH_3$ dissociation process are well known to those skilled in the art of designing chemical reactors. For example, the materials of construction for processes which operate at 800° or 900° F. are less expensive than materials which can be used at 1200° to 1800° F. It is also possible at the lower temperatures to use materials which can tolerate greater pressures. The use of higher pressures results in lower space requirements for the equipment. Whereas conventional methods employ pressures from atmospheric to about 10 p.s.i.g., using the process of this invention, higher pressures, e.g. between about 2 and about 100 atmospheres can be employed. The pressure is not limited by equilibrium considerations, but by the material and design of the equipment and by suitable delivery pressure for the $H_2$.

In addition to the advantages of lowering the capital costs and operating costs, the higher pressures are more suitable for $H_2$ diffusion. By operating at lower temperatures, heat losses are considerably reduced.

According to the present invention, $NH_3$ is dissociated and $H_2$ is removed from the reaction zone. As shown above, by such removal of $H_2$ from the reaction zone, it is possible to use lower temperatures and higher pressures to realize essentially the same percent of conversion. As a result in addition to lower heat requirements, the need for a compressor for $H_2$ diffusion is eliminated. Although units can be designed to convert the $NH_3$ to any desired extent, because of high capital costs, it is often more advantageous to reduce the cost of the equipment rather than to achieve more efficient conversion. Using the method of this invention, it is possible to use less expensive materials and simpler and less expensive equipment.

In units, particularly small portable units, where the primary concern is not the complete conversion of $NH_3$, but the size, weight and self-containment of the system, it is often more advantageous to separate the dissociation and diffusion processes. This can help to reduce the weight of the unit by minimizing the amount of catalyst required and the size of the unit by minimizing the surface area of the diffusion element. In a system in which complete conversion of the $NH_3$ is not sought, it is possible to maintain a higher differential in partial pressure of the $H_2$ across the diffusion elements if the diffusion element is not integral with the $NH_3$ dissociation catalyst bed.

The process of the present invention can be effected in any apparatus of the type generally used for conducting chemical reactions, such apparatus being provided with suitable hydrogen diffusion elements to provide for separation of a diffused hydrogen stream from the reaction mixture during the course of the ammonia cracking reaction.

For example, a compartmented reactor can be employed which reactor contains a reaction chamber and a diffusion chamber, the diffusion wall of the diffusion chamber being composed of a noble metal permeable to hydrogen. Such diffusion chamber may consist of tubular elements of hydrogen-permeable materials, such as straight or coiled tubes of palladium alloy or construction, or may comprise compartments having one or more walls of hydrogen-permeable foil or film. Where such foils are employed, they may be supported or backed by suitable rigid, porous materials to provide structural characteristics necessary to resist deformation due to pressure differences between the reaction chamber and the diffusion chamber. Integral with the reaction chamber and in indirect heat exchange relationship therewith, is provided a combustion chamber, in which undiffused gases from the reactor are burned to provide heat necessary to maintain the endothermic ammonia cracking reaction.

Palladium and palladium alloys have been found to be particularly suitable materials for the walls of the diffusion chambers, e.g. palladium-silver alloys of the type disclosed in U.S. Patent No. 2,773,561. Such materials provide rapid diffusion of essentially completely pure hydrogen, the diffusion gas having less than 1 part per billion (p.p.b.) impurities. Palladium and its alloys are particularly useful in the process of the present invention since hydrogen diffuses through these materials at realistics commercial rates at temperatures ranging from about 400° F to 2000° F. The upper temperature limit is dictated by strength considerations of the unit being used, which is a function of the particular design and materials of construction. Other noble metals permeable to hydrogen, e.g. platinum and its alloys, can be employed.

The process effected according to the present invention can be conducted at atmospheric or super-atmospheric pressure, and the design of the diffusion unit is readily adapted to operation under varying conditions of pressure. Where the reaction is effected at super-atmospheric pressure, the walls of the diffusion chamber can be made of sufficient strength to withstand such pressures, for example, pressures up to 500 p.s.i.g. and even 1000 p.s.i.g. Desirably, the walls are designed to provide minimum thickness consistent with maximum desirable pressure differential across the diffusion membrane, since $H_2$ diffusion is a function of both pressure differential and wall thickness in a diffusion process. Advantageously, wall thickness can be kept to a minimum by providing sweep gas within the diffusion chamber at a pressure which can be adjusted to provide desirable differential pressure without collapse of the chamber wall.

The invention will be described in conjunction with the drawing attached hereto which drawing provides exemplary flows and apparatus for effecting the novel process described herein.

In accordance with the invention, there is provided a reservoir of liquid ammonia, an ammonia cracking unit containing a precious metal catalyst which has good cracking activity at temperatures down to about 800° F., and a palladium alloy diffusion coil to withdraw the hydrogen produced from the cracked ammonia. The ammonia dissociation unit is heated by catalytic combustion of the residual hydrogen and/or $NH_3$ leaving the ammonia dissociator. By only partially withdrawing the hydrogen from the cracked ammonia, e.g. about 50% of that produced in the cracking reaction, a relatively high diffusion rate through the palladium alloy membrane is obtained. The heating of the ammonia dissociator is carried out countercurrently so that the heat of the combustion gas is utilized to preheat the ammonia for the splitting and the total ammonia consumption is kept at a minimum.

The heat required for the start-up of the unit is obtained by catalytic combustion of ammonia which is injected through a special feed line. The combustion catalyst employed for the catalytic heating is active to promote ammonia combustion upon providing locally a start-up temperature of the order of 1200° F. The start-up temperature can be provided in various ways, for instance by a small nichrome coil heater heated electrically. Another way of start-up would be to apply briefly the heat of a torch to the catalyst bed at a suitable point.

Upon starting the generator, the hydrogen produced by ammonia dissociation will diffuse through the palladium alloy tubing and become available for use as, for example, in a fuel cell, and combustion of undiffused gases from the reactor will provide necessary heat to support the cracking reaction.

Referring to the drawing, a pressured ammonia storage vessel 10 is provided with an exit line 11 for discharge of ammonia vapor. Float 12 positioned within storage vessel 10 is adapted to maintain the opening of line 11 above the liquid level of ammonia in the vessel, for example by flexibly attaching float 12 to line 11, so as to supply vapor to the system even if the unit is tilted. Other means to provide vapor from a portable reservoir which may be tilted are well known in the art, e.g. suitable check valves. Pressure regulator 13 in line 11 provides ammonia feed at any desirable pressure to line 14 for example from about 2 atmospheres to about 100 atmospheres. Manual valve 15 is of the open-closed type, and is advantageously used in starting up or closing down operation without the need for varying the setting of pressure regulator 13.

Ammonia vapor at the desired pressure is introduced by line 16 to preheater coils 17 in reactor 18. Reactor 18 is suitably a cylindrical reaction vessel provided with annular jacket 19 and inner chamber 20, the entire apparatus being suitably insulated by insulation (not shown) to reduce heat loss by radiation to a minimum. Preheater coils 17 can be positioned within reactor 18, as shown, to provide a compact assembly, or may be separate therefrom. Within chamber 20 are disposed diffusion elements 21 defining a diffusion chamber which in the present example are tubular elements composed of palladium-25% silver alloy. The ends of the diffusion elements 21 terminate in headers 22 and 23 from which hydrogen which diffuses into the diffusion chamber is passed by lines 24 and 25 to valved line 26. The diffusion elements may be of such design and configuration shown and described in U.S. Patent 2,911,057. Pure hydrogen produced by ammonia dissociation is withdrawn from line 26 for utilization as fuel in associated fuel cell (not shown) or for other purposes.

Diffusion elements 21 disposed within the reaction chamber 20 surrounded by solid particulate dissociation catalyst 27 which is effective in promoting the dissociation of ammonia to nitrogen and hydrogen. Annular jacket 19 is partially or completely filled with combustion catalyst 28 consisting in this example of 0.5% platinum on alumina pellets, which is employed to promote the reaction of undiffused hydrogen and unconverted ammonia with added oxygen as hereinafter more fully described, and to provide sufficient heat to effect the dissociation of ammonia. Hot gases produced in jacket 19 pass around inner reaction chamber 20 and over coils 17 providing for initial preheating of the ammonia feed.

Returning now to the ammonia feed, preheated ammonia vapor exits preheater coils 17 and is distributed by header 30 over dissociation catalyst 27. Hydrogen formed by dissociation immediately diffuses through the walls of diffusion coils 21 and a continuous stream of pure hydrogen exits line 26. The reactor itself is advantageously operated at a pressure of 35 to 50 p.s.i.g. and temperature of 800° to 1400° F., ejecting a pure hydrogen stream at a pressure of up to 8 p.s.i.g.

Nitrogen and undiffused hydrogen leave reaction chamber 20 by collector 31 and line 32. In a preferred method of operating, this waste stream contains from 30 to 50 percent $H_2$, the remainder being $N_2$ together with dry ammonia that has not been cracked. This waste stream passes by line 32 to line 33, where it is mixed with air and fed to combustion catalyst 28. The undiffused hydrogen and ammonia, if present, thus provides fuel for maintaining the desired temperature within the reactor. Waste gases of combustion, including nitrogen and water, exit annular jacket 19 by line 35, after passage over preheater coil 17 and may be discharged to the atmosphere.

In starting-up operations, valved line 36 is provided to permit initial addition of ammonia vapor as fuel to the combustion catalyst. An electrically heated coil 37 embedded in combustion catalyst 28 provides initial heat to provide a local start-up temperature of about 1200° F., sufficient to effect air oxidation of ammonia and to provide heat until the $N_2$–$H_2$ stream is sufficient to provide sufficient fuel for combustion. Alternatively, the unit can be started by briefly applying the heat of a torch to the combustion catalytic bed at a suitable point. Upon starting the generator, the hydrogen produced by ammonia dissociation will diffuse through the palladium alloy tubing and become available for use in a fuel cell.

The delivery pressure of the hydrogen produced in the generator described above will range from 1 to about 5 p.s.i.g. at an operating pressure in the dissociator of 35 p.s.i.g. Thus the generator can be employed at temperatures as low as 22° F. without any added provision for pressurizing the ammonia gas feed, the vapor pressure of ammonia at such temperature being sufficient to provide the requisite gaseous ammonia feed. Where operation at higher pressure is desired, for example up to 500 p.s.i.g., auxiliary heating means can be provided for increasing the vapor pressure of the ammonia source, or apparatus can be provided for increasing the pressure of the ammonia feed.

By the method of the present invention, a hydrogen generator can be provided which will produce 0.25 pound of hydrogen over a 12 hour period in an apparatus having an estimated total weight including fuel supply of about 15 pounds and a volume of about 1.5 cubic feet. Such a generator represents a novel and unique development. By integrating the catalytic reactor and a hydrogen separator into one compact unit, utilization of heat as well as equipment weight is optimized and the chemical generation of hydrogen is promoted. By continuously withdrawing hydrogen from its formation region it becomes possible to produce hydrogen at good yield even at pressure and temperature conditions at which normally equilibrium conditions would dictate an incomplete conversion.

While the invention has been described in connection with a preferred embodiment wherein a unitary ammonia cracking hydrogen diffusion zone is provided, it will be understood that the invention in its broadest aspect includes the method of operating wherein ammonia is contacted with a cracking catalyst to form a gaseous mixture containing nitrogen and hydrogen, a part of the so-formed hydrogen is separated from the gaseous mixture by hydrogen diffusion techniques, and the undiffused gases containing hydrogen and unconverted ammonia are burned and the heat of said combustion is employed to support the cracking reaction.

The ammonia cracking catalyst which is employed in the process of the present invention is a precious metal catalyst of the type disclosed in U.S. Patent 2,601,221, such catalysts are effective for the splitting of ammonia at temperatures as low as 800° F. and up to about 1000° F. Typically, rhodium, ruthenium or iridium can be employed for this purpose, 0.1 to about 2% by weight of the catalyst being disposed upon an inert support, such as a refractory metal oxide including aluminum oxide, zirconium oxide and the like. Where desired, the cracking reaction may be effected at more elevated temperatures, e.g. temperatures as high as 1000° F. or even 1300° F. and in such case supported platinum catalysts are effective in cracking ammonia to nitrogen and hydrogen.

Combustion catalysts employed for effecting the combustion of residual ammonia and hydrogen in the undiffused gas stream from the reactor comprise supported precious metal catalysts preferably platinum on alumina, zirconium or similar refractory support. Such catalysts are well known to the art. Specific catalysts which are effective for this purpose are disclosed in U.S. Patent 2,601,221, particularly 0.1 to 2% platinum on alumina.

As a result of the lower reaction temperatures required to convert ammonia in high yield to hydrogen when a catalytic reactor and hydrogen separator are integrated into a unitary reaction system, it becomes possible to design a compact hydrogen generator wherein heat required to support the ammonia cracking reaction is supplied by combustion of undiffused product gases which have been depleted in hydrogen content. The undiffused gas stream from such a reactor-diffusion separator contain undiffused hydrogen and unconverted ammonia in an amount dependent upon the rate of ammonia feed to the reactor and the rate of hydrogen withdrawal from the diffusion unit. By operating in accordance with the present invention, it becomes a simple matter to adjust the various flows into and out of the reactor to achieve a heat balance which will result in a sustained production of hydrogen without the need for heat input from any outside source. Thus an integral, self-sustaining hydrogen generator is provided which can readily be designed as a portable unit which can be employed independently of any extraneous utility source such as fuel, electrical energy or the like.

What is claimed is:

1. A process for the production of hydrogen which comprises contacting gaseous ammonia with a cracking catalyst at an elevated temperature to produce a gaseous mixture containing hydrogen and nitrogen, contacting said gaseous mixture with one side of a noble metal diffusion membrane permeable to hydrogen to separate a diffused gas stream consisting of pure hydrogen from an undiffused gas stream containing residual undiffused hydrogen, admixing said undiffused gas stream with oxygen containing gas to effect the combustion thereof and employing the resultant heat of combustion to maintain the temperature of said cracking catalyst at said elevated temperature.

2. The process of claim 1 wherein said undiffused gas stream contains ammonia.

3. The process of claim 1 wherein ammonia is contacted with said cracking catalyst at a temperature between about 800° F. and 1200° F. and a pressure between about 2 and 100 atmospheres.

4. The process of claim 1 wherein the noble metal diffusion membrane is employed as the cracking catalyst.

5. The process of claim 1 wherein said cracking catalyst comprises a platinum group metal on a refractory particulate support.

6. The process of claim 1 wherein said diffused gas stream contains about 20 to about 75% of the hydrogen produced.

7. A process for the production of hydrogen which comprises contacting gaseous ammonia with a noble metal cracking catalyst at a temperature between about 800° and about 1400° F. to produce a gaseous mixture containing hydrogen and nitrogen, contacting said gaseous mixture with one side of a noble metal diffusion membrane permeable to hydrogen to separate a diffused gas stream consisting of pure hydrogen and an undiffused gas stream containing residual undiffused hydrogen, admixing said undiffused gas stream with oxygen containing gas and contacting the resultant admixture at elevated temperature with a combustion catalyst, and employing the resultant heat of combustion to maintain the temperature of said cracking catalyst between about 800° F. and 1400° F.

8. The process of claim 7 wherein said cracking catalyst comprises at least one metal of the group consisting of rhodium, ruthenium, and iridium on a support.

9. The process of claim 7 wherein said cracking catalyst comprises rhodium on alumina.

10. The process of claim 7 wherein said combustion catalyst comprises platinum on alumina.

11. A process for the production of hydrogen which process comprises the steps of contacting ammonia gas with a solid particulate cracking catalyst at a temperature between about 800° F. and 1400° F. and a pressure between about 2 atmospheres and about 100 atmospheres, effecting said contacting in a reactor within which is disposed a diffusion chamber whose wall is a noble metal permeable to hydrogen, continuously removing from about 20 to about 75% of the hydrogen from within said diffusion chamber, continuously removing an undiffused gaseous reaction mixture from said reactor, admixing said undiffused gaseous reaction mixture with oxygen-containing gas and effecting the combustion thereof, and employing the heat of said combustion to maintain the cracking catalyst at a temperature above about 800° F.

12. The process of claim 11 wherein said diffusion chamber wall is composed of a material selected from the group consisting of palladium and palladium alloys.

13. The process of claim 11 wherein the cracking catalyst consists of rhodium on a support.

14. The process of claim 11 wherein the cracking catalyst consists of ruthenium on a support.

15. The process of claim 11 wherein the cracking catalyst consists of iridium on a support.

16. The process of claim 11 wherein combustion is effected in the presence of a catalyst consisting of platinum on a support.

17. A portable hydrogen generator comprising in combination an ammonia source, a combustion chamber disposed in indirect heat exchange relationship with a compartmented reactor consisting of a reaction chamber and a diffusion chamber, the wall between said reaction chamber and diffusion chamber being a noble metal permeable only to hydrogen, means for introducing ammonia gas to the reaction chamber, means for removing pure hydrogen from the diffusion chamber, means for removing gaseous products from said reaction chamber and means for introducing said gaseous products into said combustion chamber.

18. Apparatus as defined in claim 17 including means for preheating ammonia vapor by indirect heat exchange with combustion gases within said combustion chamber.

19. Apparatus as defined in claim 17 wherein said diffusion chamber comprises at least one tubular member composed of material selected from the group consisting of palladium and palladium alloys.

References Cited by the Examiner

UNITED STATES PATENTS

| | | | |
|---|---|---|---|
| 1,124,347 | 1/15 | Snelling | 23—212 X |
| 1,213,470 | 1/17 | Finlay | 23—210 X |
| 2,637,625 | 5/53 | Garbo | 23—2.1 |
| 3,025,145 | 3/62 | Terpenning | 23—288 |

FOREIGN PATENTS 579,535    7/59    Canada.

MAURICE A. BRINDISI, *Primary Examiner.*